United States Patent [19]
Mochizuki

[11] 3,875,579

[45] Apr. 1, 1975

[54] THROUGH-THE-VIEWFINDER LIGHT SHADING DEVICE

[75] Inventor: Toshio Mochizuki, Tokyo, Japan

[73] Assignee: Asahi Kogaku Kogyo Kabushiki Kaisha, Tokyo-to, Japan

[22] Filed: Sept. 10, 1973

[21] Appl. No.: 396,113

[30] Foreign Application Priority Data
Sept. 16, 1972 Japan.............................. 47-107893

[52] U.S. Cl.................... 354/154, 354/22, 354/60
[51] Int. Cl.... G03b 19/12, G03b 17/40, G03b 7/08
[58] Field of Search......... 354/154, 59, 23, 60, 152, 354/22

[56] References Cited
UNITED STATES PATENTS

| | | |
|---|---|---|
| 3,487,759 | 1/1970 | Fahlenberg........................ 354/154 |
| 3,613,543 | 10/1971 | Mita et al............................ 354/154 |

*Primary Examiner*—Richard A. Wintercorn
*Attorney, Agent, or Firm*—Christie, Parker & Hale

[57] ABSTRACT

A single lens reflex camera has a conventional through-the-lens light metering system that is subject to an error caused by light entering through the eyepiece of the camera viewfinder. To render the light metering system immune from this error, a member is movable into and out of position where it blocks light entering through the eyepiece. An electromagnet magnetically attracts the member to move into this position when energized through the operation of a switch connecting the electromagnet's coil to a battery. A self-timer mechanism provides automatic control over the operation of the switch.

2 Claims, 8 Drawing Figures

PATENTED APR 1 1975

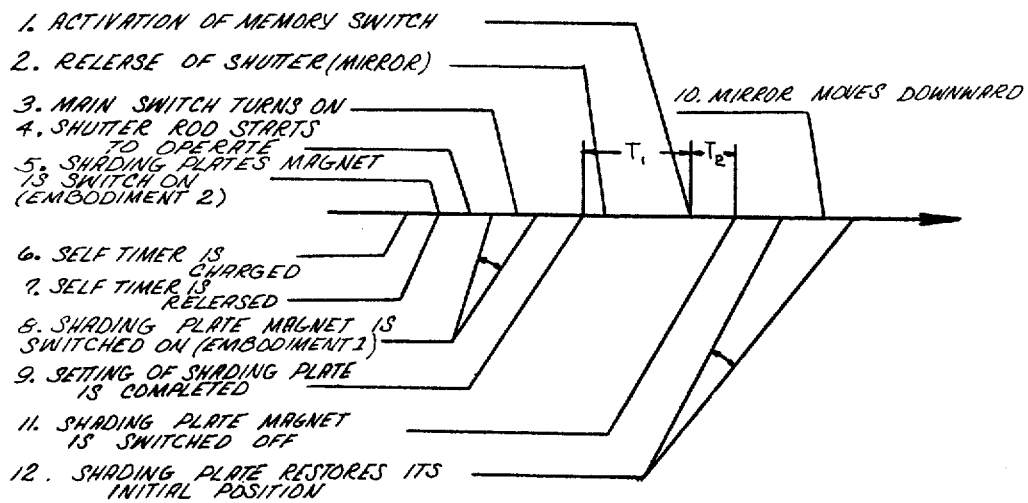
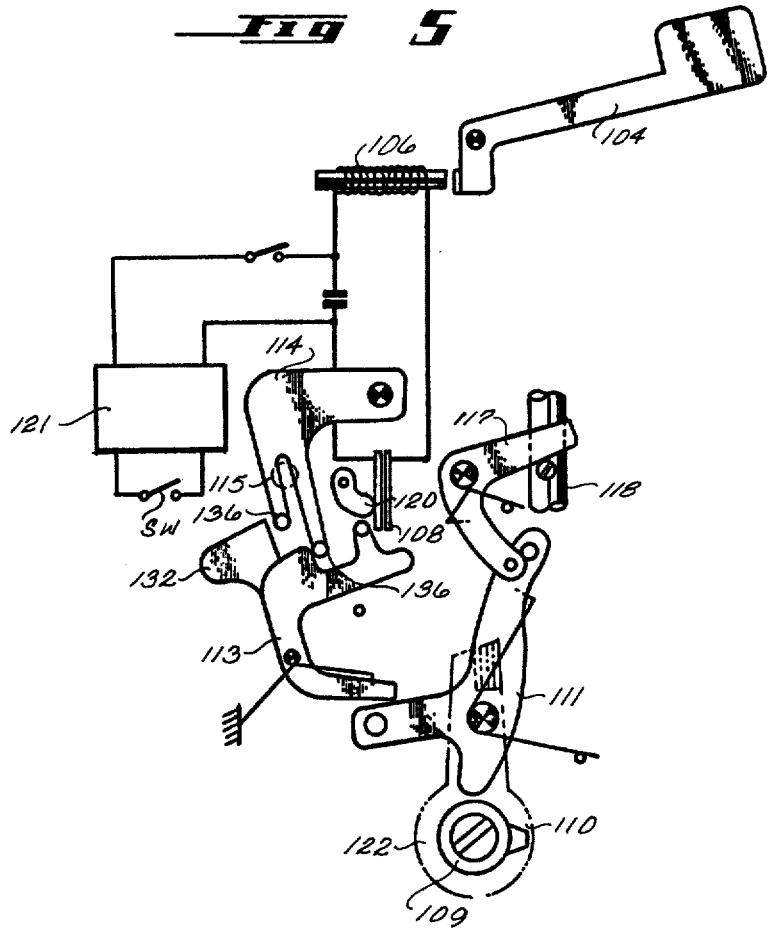

THROUGH-THE-VIEWFINDER LIGHT SHADING DEVICE

BACKGROUND OF THE INVENTION

In general this invention relates to single lens reflex cameras of the type having through-the-lens light metering systems. In particular, it relates to a viewfinder shading device for such cameras.

The well-known single lens reflex camera (SLR) includes a camera body, an objective lens, a shutter mechanism, and a viewfinder. For purposes of assisting the photographer in composing his picture, the SLR is arranged so that ight entering the camera body through the objective lens is reflected by a mirror onto a ground glass focusing screen. A pentaprism and an eye lens are provided so that the photographer can look through the eyepiece of the viewfinder and see the image formed on the focusing screen, this image being substantially the same as the image which will be focused on the film when the shutter release mechanism is operated.

In one well-known type of SLR there is provided an automatic exposure control system that is primarily responsive to light entering through the objective lens. The exposure control system provides for measuring the light emanating from the object to be photographed. The measuring is effected before the shutter is opened, and based upon the measurement, control is exercised so that the film is subjected to an exposure that as near as possible is optimum.

There exists in cameras of this type a source of error. This relates to reverse light, that is, light entering through the eyepiece and thereby affecting the exposure control system. Normally, considerably less reverse light enters than the amount of light that enters through the objective lens. This is particularly so when a bright scene is to be photographed whereby there is a substantial amount of light entering the objective. Also, when the camera is hand-held with the eyepiece adjacent the photographer's eye, to some extent, light is blocked from entering through the eyepiece. However, in other cases, significant problems arise from this reverse light, as, for example, in microscopic photographing, or short distance photographing when the photographed object is of low brightness. In particular, in remote controlled photographing, a relatively larger amount of reverse light enters. Generally in remote controlled photographing, a motor drive or the like is used or a self-timer within the camera can be used, and there is nothing adjacent the eyepiece to block reverse light.

To block the reverse light, a cap can of course be placed over the eyepiece. This would however be a nuisance for the photographer because of the need to remove and replace it as desired.

SUMMARY OF THE INVENTION

The apparatus of this invention reduces or substantially eliminates the adverse effect of such reverse light. To this end, a member is provided for blocking the reverse light from affecting the automatic exposure control system. This member or shading plate is movable into and out of a blocking position automatically. Preferably, the automatic control of the shading plate is used in connection with the above-described situations in which reverse light would otherwise cause significant errors and provides an interlocking mechanism.

The apparatus further included means, including an energizable electromagnet, for moving the shading plate. A battery is connectable through a switch to the electromagnet for energizing it. The switch has a normally open position and a self-timer mechanism is provided for sequentially closing the switch and then returning it to its normally open position.

BRIEF DESCRIPTION OF THE DRAWINGS

FIG. 4 is a time sequence chart showing the sequence in which the important part in said embodiment of FIG. 1 operates;

FIG. 5 schematically shows another preferred embodiment of the device according to the present invention.

DETAILED DESCRIPTION

Figure 1:
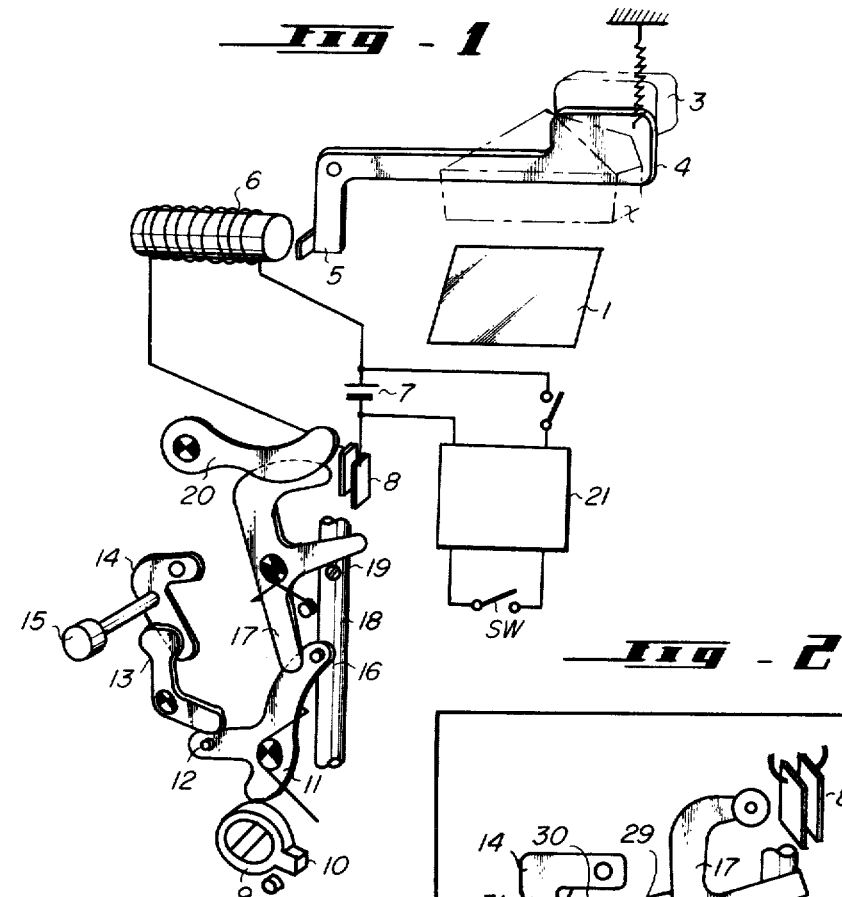
FIG. 1 schematically shows a preferred embodiment of the device according to the present invention.

Referring to FIG. 1, first, light coming through the objective from an object to be photographed is reflected by a reflecting mirror 1 of a single-lens reflex camera to a pentaprism 2 which, in turn, directs the light to an eye lens 3. There are provided photosensitive elements for light measuring purposes on both sides of this eye lens 3 although they are not shown. There is provided a gap into which a shading plate 4 advances adjacent the eye lens 3 between said pentaprism 2 and said eye lens 3. It will be understood that said photosensitive elements are located nearer to said pentaprism 2 than the shading plate. An arm 5 of said shading plate 4 serves at one end as an attractive piece of an electromagnet 6 having an armature.

An electric circuit for energization of a coil of said electromagnet 6 comprises electric current carrying conductors, a source battery 7 and a switch 8 which is inserted in series with said source battery 7 and consists of two contacts opposing each other. When the circuit is closed by bringing said contacts of the switch 8 into mutual contact as the case demands and thereby the one end of the arm 5 is attracted by the armature of the electromagnet 6, the shading plate 4 advances from its normal position at which said plate 4 is held out of said gap under effect of a spring into said gap and thereby cuts off the light coming through the eye lens 3 from going into the camera.

A mechanism adapted for automatic closure of said switch 8 comprises a lever 11 mounted so that one end of said lever 11 is opposed to a range within which a ring 9 rotatable in unison with a self-timer setting lever and a projection 10 on the periphery of said ring 9 may move and said projection 10 may move beyond said one end, a lever 13 adapted to be rotated by a pin 12 planted on the other end of said lever 11, a leaf spring 14 fixed at one end and having a resilience in the direction transversing a plane in which the one end of said lever 13 moves, a self-timer starting button 15 adapted to be depressed against said resilience of said leaf spring 14, and a lever 17 adapted to be rotated by a pin 16 planted on another end of said lever 11. Said last mentioned lever 17 having two ends in addition to the end at which said lever 17 is rotated by said pin 16, of which the one is adapted to be brought into contact with a pin 19 planted on a shutter release rod 18 and the other is adapted to be brought into contact with the contact of said switch 8 to urge them, respectively, Such an arrangement will be more apparent from the following description in connection with FIG. 2.

FIG. 1 further shows a lever 20 which is separately moved by manual operation as opposed at one end to said switch 8 and an automatic exposure time control circuit 21 inclusive of a photometric circuit.

Now, referring to FIG. 2 which shows in detail a mechanism adapted for automatic closure of said switch 8, the manner in which this mechanism operates will now be described. In the situation corresponding to FIG. 2 in which the relative positions of various parts at a normal state, i.e., at the state where no photographing is carried out by the self timer mechanism, a normal photographing may be done by depression of the shutter rod 18. In such a normal photographing, no automatic operation of the shading plate 4 occurs since said mechanism adapted for automatic closure of said switch 8 is never activated.

In photographing by use of the self-timer, on the other hand, a self-timer charge lever 22 is counterclockwise rotated from the shown position before photographing. This causes a flat spiral spring 23 to be stressed and simultaneously the projection 10 comes into contact with one end of the lever 11 during operation of said lever 22 which is then clockwise rotated by said projection 10 against effect of a spring 24 until said projection 10 moves beyond the one end of said lever 11. After the projection 10 has moved beyond said one end of the lever 11, said lever 11 restores the position as shown. A gear 25 is engaged with a smaller gear of a gear assembly 26 consisting of a larger gear and said smaller gear under biasing effect of said flat spiral spring 23 and said larger gear of this gear 26 is engaged with a smaller gear of another gear assembly 27 consisting also of a larger gear and said smaller gear. The larger gear of said last mentioned gear assembly 27 is engaged with a gear 28 included in a planet gear 29. These gears constitute an interlocking mechanism. There is provided an anchor 30 adapted to be engaged with said planet gear 29 for control of rotating velocity thereof. A lever 32 is supported coaxially with said lever 13 and there is a spring 33 suspended between these both levers 13 and 32 so that the both may move in unison. Said lever 32 is held at one end against a pin 31 planted on a free end which forms a radial extension of said lever 32 including a pivot thereof.

Although the gear 25 also is simultaneously rotated as the flat spiral spring 23 is stressed by operation of said self-timer charge lever 22, it is possible to operate said lever 22 free from operative association with the planet gear 29 since said intermediate gear assembly 26 is disengaged from said gear 25 along a slit 35 into which a shaft 34 of said gear assembly 26 is slidably inserted. On the way of this operation of said self-timer charge lever 22, the projection 10 rotates the lever 11 which, in turn, rotates the lever 13 until said lever 13 is locked by a pin 36 planted on the leaf spring 14. In this state, said anchor 30 is locked with the pin 31 planted thereon by the lever 32 and thereby said planet gear 29 is locked by said anchor 30.

Figure 2:
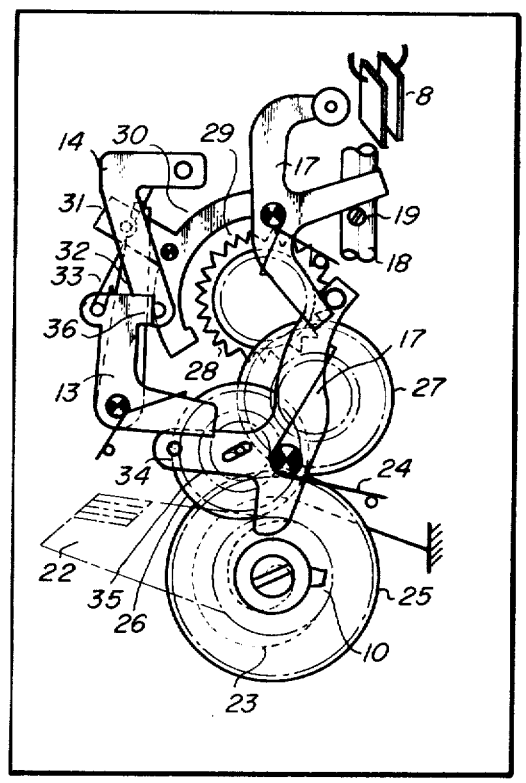
FIG. 2 shows in detail an important part in said embodiment of FIG. 1.

Depression of the button 15 for starting of the selftimer causes the leaf spring 14 to be depressed with respect to the plane of FIG. 2, with a result that the pin 36 of said leaf spring 14 retracts from the position at which said pin 36 locks the lever 13, and said lever 13 is now slightly rotated under effect of its biasing spring until one end thereof comes into contact with one end of the lever 11. This rotation causes the lever 32 to be disengaged from the pin 31, the anchor 30 to be released and the planet gear 29 to be rotated by the gear system 25, 26 and 27 under effect of the energy stored in the flat spiral spring 23.

As the gear 25 is rotated with the rotating velocity under control of the planet gear 29 after the timer has been started, the projection 10 comes again in contact with one end of the lever 11 and rotates it, and said lever 11, in turn, rotates with the other end the lever 17 clockwise as seen in FIG. 2. Said lever 17 comes at one end into contact with the pin 19 planted on the release rod 18 and depresses it down to the position at which the release is started while said lever 17 moves at the other end toward the contacts of the switch 8.

Figure 3:
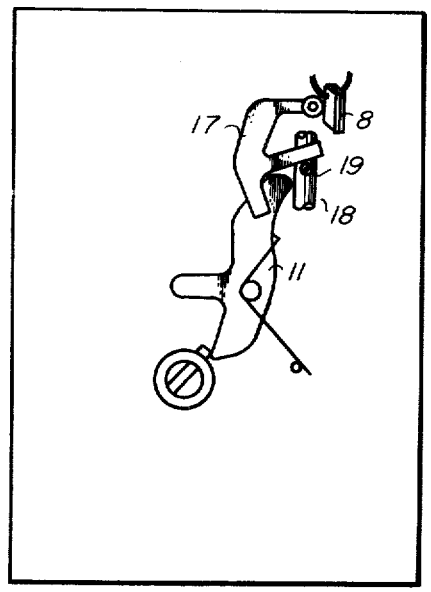
FIG. 3 shows the manner in which a partial mechanism in said embodiment of FIG. 1 operates.
Figure 6:
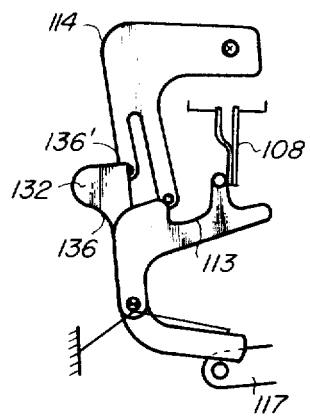
FIGS. 6 to 8 show the manner in which said other embodiment of FIG. 5 operates, respectively.
Figure 7:
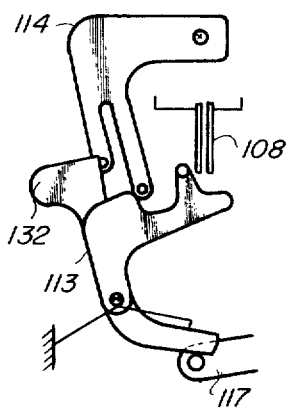
Figure 8:
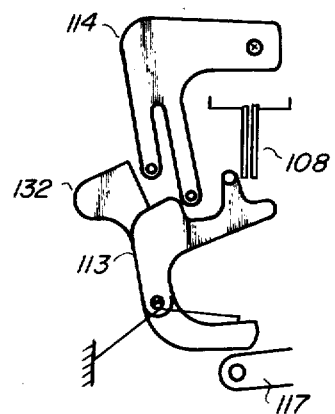

Said lever 17 functions to close said switch 6 before the release is actually started and further rotation of said gear 25 sufficiently depressed the release rod 18 to effect release starting as shown by FIG. 3.

The gear 25 continues to be rotated thereafter and further rotation thereof causes the projection 10 to move beyond one end of the lever 11 toward the position prior to the charge. The lever 11 now free from control of the projection 10 is rapidly rotated back under effect of its associated biasing spring 24. Upon this rotary restoration of the lever 11, the lever 17 also is rotated back under effect of its associated biasing spring, resulting in that the release rod 18 returns upward and the switch 8 is opened again.

It will be seen from the aforegoing description that, with the device according to the present invention, it is possible in photographing by the self-timer to close the switch 8 and thereby to cut off the light entering from the eye lens by the shading plate 4 through operation of said self-timer before starting of shutter release or, in actual, before a photometric operation prior to starting of shutter release, and further to automatically remove said shading effect through further operation of said self-timer for restoration of the normal position.

The operation of the device according to the present invention as aforementioned will be more apparently understood in reference with the time sequence chart as shown by FIG. 4.

The switch 8 for energization of the electromagnet 6 which serves to drive said shading plate 4 is arranged to be opened and closed also by the lever 20 for manual operation, so that this lever 20 may be previously operated to accomplish photographing through a microscope, photographing for copying or photographing by a motor drive or the like under remote control.

It should be noted here that the time point at which the switch 8 is closed in the embodiment shown by FIG. 1 is slightly after the button 15 has been depressed in the self-timer release. Such a time delay may be substantially compensated by use of the photosensitive element of high response characteristic such as Si. In the case where the photosensitive element of low response characteristic such as CdS is used, a time duration from completion of shading by the shading plate to start of release might by insufficient for light measuring so far as a photographed object of low brightness is concerned, resulting in that an error in light measuring caused by the light entering through the eye lens might not be sufficiently compensated. When the photosensitive element of low response characteristic such as CdS, therefore, the time point at which the switch 8 is closed must be advanced.

Now, another embodiment of the device according to the present invention will be described referring to FIG. 5 in connection with the requirement as mentioned above.

In FIG. 5, the self-timer mechanism and the automatic exposure time control circuit are shown as those of well known art as in the embodiment shown by FIG. 1. Their functions for every manner of use also are identical to those in said embodiment of FIG. 1.

When the self-timer is used, first, a leaf spring 114 is pushed by a self-timer release button 115 to remove locking effect of pins 136 and 136' upon levers 113 and 132 which are, in turn, clockwise rotated as seen in FIG. 5 and simultaneously contacts of a switch 108 is pushed by one end of said lever 113 so as to close said switch 108. This is the process until a self-timer charge lever 122 charges the self-timer. Operation thereafter is carried on in the same manner as in the embodiment of FIG. 1 except that a lever 117 is clockwise rotated, depressing a shutter rod 118, and, during a further depression after shutter release, a separately formed end of said lever 117 reversely pushes one end of the lever 113 so as to be counterclockwise rotated. This reverse rotation of said lever 113 causes the pin 136 planted on the leaf spring 114 to be held again open and a shading plate 104 to move out of the position at which said plate 104 is effective for shading. In photographing through microscope, photographing for copying, photographing by a motor drive under remote control or the like, shading and removal thereof may be effected by opening and closing through manual operation of a member 120 which corresponds to the lever 20 in the embodiment shown by FIG. 1.

What is claimed is:

1. In a single lens reflex camera having an automatic exposure control system that is primarily responsive to light entering through the objective lens but that is subject to an error caused by light entering through the eyepiece of the camera viewfinder, the combination comprising a member movable into and out of a position where it blocks light entering through the eyepiece so that the exposure control system is rendered immune from said error; an energizable electromagnet including an armature; means including said armature for moving the member; a battery; electric current carrying conductors for conducting current for energizing the electromagnet; a switch having a normally open position and being closable to a complete circuit through which current supplied by the battery flows through the conductors to energize the electromagnet and a self-timer mechanism operative to sequentially close the switch and then return it to its normal position so that light measuring by the exposure control system is accomplished with the member blocking the error-causing light.

2. A device for cutting off light entering through an eye lens into a photographic camera of through-the-lens light measuring type having therein an electronic shutter, the device comprising an electromagnet; a member serving to cut off light entering through the eye lens, the member being arranged so that advancement and retracting of said member into and out of a position at which said member is effective for shading is effected by a driving operation of the electromagnet; controllable means for energizing the electromagnet, the controllable means including electric current carrying conductors for conducting current for energizing the electromagnet, and a switch closable to complete a circuit through which current flows through the conductors to energize the electromagnet; and a self-timer mechanism for controlling the controllable means to effect energization of the electromagnet in a series of operations consisting of the first half stage of starting and the second half stage of starting and thereby light measuring is accomplished with the light entering through the eye lens being cut off.

* * * * *